K. NAUDULAITIS.
PROTECTOR FOR HORSES.
APPLICATION FILED NOV. 30, 1921.

1,425,676.

Patented Aug. 15, 1922.

INVENTOR.
Kleofas Naudulaitis
BY George C. Heinrich
ATTORNEY.

UNITED STATES PATENT OFFICE.

KLEOFAS NAUDULAITIS, OF CHICAGO, ILLINOIS.

PROTECTOR FOR HORSES.

1,425,676.  Specification of Letters Patent.  Patented Aug. 15, 1922.

Application filed November 30, 1921. Serial No. 518,925.

*To all whom it may concern:*

Be it known that I, KLEOFAS NAUDULAITIS, a citizen of Lithuania, residing at Chicago, county of Cook, and State of Illinois, have invented certain new and useful Improvements in Protectors for Horses, of which the following is a specification.

This invention relates to improvements in devices for protecting the heads of horses or similar animals against the sun, and it is the principal object of the invention to provide a protector of this kind which can be quickly attached and removed to the harness of a horse or like animal and which allows a ready renewal of the cooling medium used in connection with the protector.

Another object of the invention is the provision of a pad adapted to be filled with wet sand or a similar moisture retaining material allowing a convenient replacement of the evaporated fluid employed for keeping the sand wet.

Still further objects and advantages of my invention will become more fully apparent as the description thereof proceeds, and will then be specifically pointed out in the accompanying drawing, in which.

Figure 1:
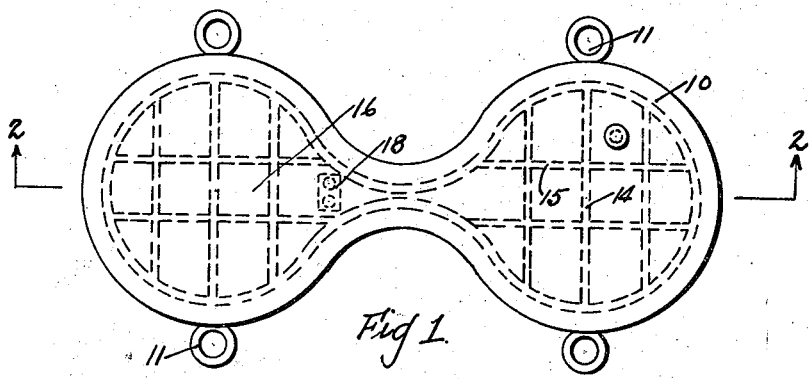
Figure 1 is a top plan view of a device constructed according to the present invention.
Figure 2:
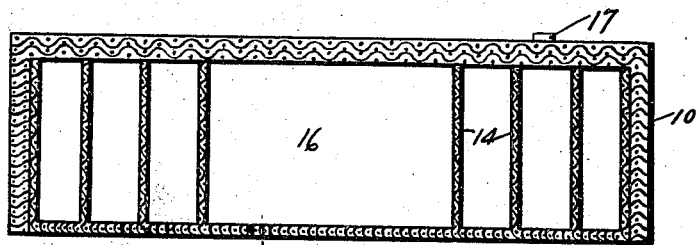
Figure 2 is a longitudinal section through such a device on an enlarged scale, the section being taken on line 2—2 of Figure 1.
Figure 3:
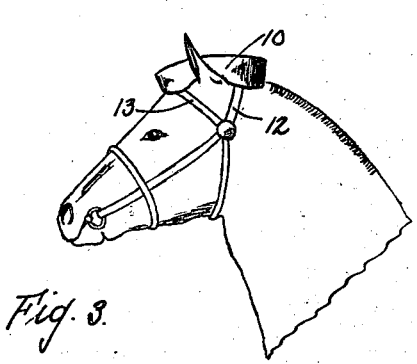
Figure 3 illustrates the attachment of the device on a horse.

The protector consists of a pad 10 having substantially the form of an 8 provided with a plurality of ears or eyes 11 on each side through which the straps 12, 13 or the harness for a horse may be drawn in order to secure the device on a horse's head.

The pad is hollowed and its interior space is subdivided by partitions 14, 15 into a plurality of chambers 16 adapted to be filled with sand or the like material which is kept moist or wet by a liquid introduced through an opening in the top wall of the pad closed by a stopper 17 while tiny openings 18 in the bottom wall of the pad allow a slow escape of the surplus of moisture.

It will be clear that changes may be made in the general arrangement and the construction of the minor details of my invention without departing from the spirit and scope of my invention.

What I claim as new and desire to secure by Letters Patent of the United States is—

A protecting hollow pad for the heads of horses comprising a flexible body, partitions within said body for dividing said body into a plurality of chambers adapted to be filled with sand, ears on said pad allowing the passage of the harness straps for securing the pad on the head of a horse, said pad having an upper opening for the admission of the sand and water, and a plurality of small bottom openings for the slow escape of the surplus of water.

In testimony whereof I have affixed my signature.

KLEOFAS NAUDULAITIS.